1

United States Patent
Snawerdt

(10) Patent No.: US 10,205,517 B2
(45) Date of Patent: *Feb. 12, 2019

(54) OPTICAL LINE CARD FOR WAVELENGTH DIVISION MULTIPLEXED SIGNALS

(71) Applicant: OYSTER OPTICS, LLC, Reston, VA (US)

(72) Inventor: Peter Snawerdt, Indian Harbour Beach, FL (US)

(73) Assignee: OYSTER OPTICS LLC, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/933,052

(22) Filed: Mar. 22, 2018

(65) Prior Publication Data
US 2018/0212677 A1    Jul. 26, 2018

Related U.S. Application Data

(63) Continuation of application No. 15/680,915, filed on Aug. 18, 2017, which is a continuation of application No. 15/159,282, filed on May 19, 2016, now Pat. No. 9,749,040, which is a continuation of application No. 13/762,717, filed on Feb. 8, 2013, now Pat. No. 9,363,012, which is a continuation of application No. 12/590,185, filed on Nov. 4, 2009, now Pat. No. 8,374,511, which is a continuation of application No.
(Continued)

(51) Int. Cl.
*H04B 10/07* (2013.01)
*H04B 10/071* (2013.01)
*H04B 10/85* (2013.01)
*H04B 10/079* (2013.01)

(52) U.S. Cl.
CPC ....... *H04B 10/071* (2013.01); *H04B 10/0705* (2013.01); *H04B 10/07955* (2013.01); *H04B 10/85* (2013.01)

(58) Field of Classification Search
CPC .............. H04B 10/071; H04B 10/0705; H04B 10/07955; H04B 10/85
See application file for complete search history.

(56) References Cited

U.S. PATENT DOCUMENTS 5,062,704 A * 11/1991 Bateman ............ G01M 11/3145
250/227.15
5,539,560 A * 7/1996 Dennis .................... H04J 14/08
385/124
(Continued)

*Primary Examiner* — Dzung D Tran
(74) *Attorney, Agent, or Firm* — Jackson Walker L.L.P.

(57) ABSTRACT

A transceiver card for a telecommunications box for transmitting data over a first optical fiber and receiving data over a second optical fiber. The card has transmitter for transmitting data over the first optical fiber, the transmitter having a laser and a modulator, a fiber output optically connected to the laser for connecting the first optical fiber to the card, a fiber input for connecting the second optical fiber to the card, a receiver optically connected to the fiber input for receiving data from the second optical fiber, and an OTDR optically connected between the transmitter and the fiber output or between the receiver and the fiber input. An energy level detector is also provided between the receiver and the fiber input.

20 Claims, 3 Drawing Sheets

Related U.S. Application Data

10/188,643, filed on Jul. 3, 2002, now Pat. No. 7,620,327.

(60) Provisional application No. 60/303,932, filed on Jul. 9, 2001.

(56) References Cited

U.S. PATENT DOCUMENTS

| | | | | |
|---|---|---|---|---|
| 5,561,727 A | * | 10/1996 | Akita | G02B 6/3897 |
| | | | | 361/785 |
| 6,157,443 A | * | 12/2000 | Jennings | H04B 10/071 |
| | | | | 356/73.1 |
| 6,529,316 B1 | * | 3/2003 | Treyz | H04B 10/0795 |
| | | | | 359/337.11 |
| 6,574,268 B1 | * | 6/2003 | Bergamo | H04J 13/004 |
| | | | | 375/142 |
| 6,826,372 B1 | * | 11/2004 | Givehchi | H04L 25/063 |
| | | | | 398/209 |
| 2002/0092972 A1 | * | 7/2002 | Ames | H03F 3/08 |
| | | | | 250/214 A |

* cited by examiner

OPTICAL LINE CARD FOR WAVELENGTH DIVISION MULTIPLEXED SIGNALS

CROSS REFERENCE TO RELATED APPLICATION

The present patent application is a continuation of U.S. patent application Ser. No. 15/680915, filed Aug. 18, 2017, which is a continuation of U.S. patent application Ser. No. 15/159282 (now U.S. Pat. No. 9,749,040), filed May 19, 2016; which is a continuation of U.S. patent application Ser. No. 13/762717 (now U.S. Pat. No. 9,363,012), filed Feb. 8, 2013; which is a continuation of U.S. patent application Ser. No. 12/590185 (now U.S. Pat. No. 8,374,511), filed Nov. 4, 2009; which is a continuation of U.S. patent application Ser. No. 10/188643 (now U.S. Pat. No. 7,620,327), filed Jul. 3, 2002, which claims priority to U.S. Provisional Patent Application Ser. No. 60/303932, filed Jul. 9, 2001; the entirety of which are all hereby incorporated by reference.

BACKGROUND OF THE INVENTION

1. Field of the Invention

The present invention relates generally to telecommunications and more particularly to transmitters and receivers for fiber optic networks.

2. Background Information

In current fiber optic networks, an electronic data stream is fed to an optical fiber multiplexor, which is also called "a box" in the industry. Each multiplexor runs on a specific transmission standard, for example, SONET. A laser and an amplitude modulation circuit for the laser typically are located on a card, which fits into the box. The laser amplitude modulator typically pulses or alters the laser output to create an amplitude-modulated optical signal representative of the electronic data stream. The laser amplitude modulator and laser thus define a transmitter for transmitting the optical signal over an optical fiber. A receiver for the amplitude-modulated optical signals of the optical data typically includes a photodiode to convert the optical signals back into the electronic data stream. Both the transmitter and the receiver typically are located on the backplane of a single card, which is replaceable should a component fail.

The card typically also contains a connector for receiving at least one optical fiber, for example a duplex SC connector. The connectors normally are located on a faceplate of the card, the faceplate being perpendicular to the backplane.

The reading of the amplitude-modulated optical data signals using the photodiode on the card is straightforward: the optical signals either produce an electric output at the photodiode or they do not. As a result, an output electronic data stream of zeros and ones is generated.

The electronics for the amplitude modulation of the laser and for the receiving of the optical data on the card thus is relatively simple. All that is required is a pulsing circuit for pulsing the laser as a direct function of the input data and a photodiode for the receiver.

Existing amplitude modulated systems have the disadvantage that the fiber can be easily tapped and are not secure.

U.S. Pat. No. 5,455,698 purports to disclose a secure fiber optic communications system based on the principles of a Sagnac interferometer. A data transmitter is a phase modulator for modulating counter-propagating light beams sent by a receiver round a loop. The receiver includes a light source, a beamsplitter for splitting light from the light source into counter-propagating light beams and for receiving the phase-modulated light beams, and an output detector. U.S. Pat. No. 5,223,967 describes a similar Sagnac-interferometer-based system operating over a single optical fiber.

The Sagnac-interferometer-based systems described in these patents have the disadvantage that they require the light to travel over a loop, whether back and forth in a single fiber or over a long length looped fiber. As a result, either the link budget for the single fiber must be doubled, reducing the data carrying capacity for a single fiber, or else a looped fiber with significant and expensive extra length of at least twice that of a single fiber must be laid between the transmitter and the receiver. Moreover, the receiver contains the light source, as opposed to the current installed base where the transmitter has the light source.

The Sagnac-interferometer-based systems thus are expensive to build and operate, and do not work particularly well with existing multiplexors or card formats.

Several companies currently provide OTDR (optical time-domain reflectometers) which can monitor an optical fiber and determine if the presence of and location of a break in the fiber. Such companies include Youth Communication Co. with the MW Series Mini-OTDR and OTDR modules from Tekronix Communications.

These detectors however are expensive and must be applied to the fiber away from the box.

U.S. Pat. No. 5,777,727 discloses details of OTDR technology and is hereby incorporated by reference herein.

SUMMARY OF THE PRESENT INVENTION

An object of the present invention is to provide a transceiver card for providing secure optical data transmission over optical fiber. Another alternate or additional object of the present invention is to provide for replacement of existing cards with a transceiver card permitting ODTR and tapping detection capabilities.

The present invention provides a transceiver card for transmitting data over a first optical fiber and receiving data over a second optical fiber, the card having a transmitter for transmitting data over the first optical fiber and a receiver for receiving data from the second optical fiber, and an OTDR connected optically to the second optical fiber upstream from the receiver. Preferably, the OTDR operates at a wavelength that is different than the wavelength used for data transmission and is connected in the optical circuit via a wavelength division multiplexed coupler. By operating the OTDR at a wavelength different than the wavelength used for data transmission, the OTDR may be allowed to continuously operate without disruption of the data traffic.

Preferably, an energy level detector is also provided on the card. The energy level detector is preferably optically connected to the second fiber between the OTDR and the receiver.

The OTDR preferably is monitored by an embedded processor within the box. The processor analyzes the OTDR output data to determine if the characteristics of the optical fiber system have changed relative to a reference characteristic. If the optical fiber system has changed relative to the reference OTDR characteristic, then a degradation of the optical fiber system, which may indicate a fiber breach or a fiber tap, can be logged along the position of the degradation source relative to the location of the OTDR. The indication of degradation of the fiber system may provide an alarm signal, for example an electronic signal sent to a network operations center to indicate the measured degradation of the fiber system along with the approximate location of the degradation point, a light on the outside of the box or a sound-emitting alarm. Alternatively, the OTDR output may be connected to a display model via an electrical connection on the card for display to a human operator, or transferred by the transceiver to be analyzed at the network operations center.

The transceiver card of the present invention preferably has fiber span length ranges for operation that are compatible with standard optical multiplexor operation, for example, two to twenty kilometers or ten to one hundred kilometers. The OTDR and energy level detector must have a measurement dynamic range that ensures proper operation over the span length limits of the transceiver card. By specifying fiber span length ranges for the OTDR and energy detector enhanced transceiver, the cost of implementation of the OTDR and energy level detector can be optimized with span length thus providing an optimized cost of implementation benefit to the customer.

The present invention thus permits a card-based transmission system incorporating an energy level detector for optical tap detection, which can provide for more secure data transmission than existing amplitude-based cards along with breach localization services from the OTDR. Because of advances in semiconductor and optical component packaging, the OTDR and energy level detector parts along with the optical transmitter and receiver components can fit all on one card compatible with most existing box dimensions.

The transmitter light source preferably is a laser, for example a semiconductor laser operating at a 1550 nm, or other, wavelength.

Preferably, the energy level detector provided on the card for measuring light energy in a fiber is connected electronically to an alarm, so that when a drop or increase in the energy level is detected, which may indicate a tap, the card may provide an alarm signal, for example an electronic signal sent to a network operations center to indicate a drop or increase in the optical energy level, a light on the outside of the box or a sound-emitting alarm. Depending upon the optical transmission method implemented, a successful tap may be placed by adding light to the system through the tapping device. Implementations of the single fiber Sagnac transmission method described in U.S. Pat. No. 5,223,967 may be susceptible to such a tapping method unless an energy level detector that monitors for an increase or decrease in the optical signal level is included as part of the design.

The card includes an optical fiber interface for at least one fiber, and preferably for two fibers. The interface may be a duplex SC connector, for example.

The card preferably is a replacement part for an existing optical multiplexor transceiver card.

The present invention also provides a method for providing a continually-operating or, preferably, a commanded operation OTDR within an existing box including the steps of:
  removing an existing transceiver card; and
  replacing the transceiver card with the card of the present invention.

The present invention also provides a method for manufacturing an optical transceiver card for transmitting data over at least one data transmitting optical fiber, the card having a transmitter and a receiver, the method comprising the steps of:
  placing a transmitter on a printed circuit board,
  placing a receiver on a printed circuit board; and
  placing an OTDR on the printed circuit board.

Preferably, an energy level detector is also placed on the printed circuit board, and a light is connected to a faceplate connected to the printed circuit board, the light indicated a change in energy at the detector or degradation of the optical fiber system.

BRIEF DESCRIPTION OF THE DRAWINGS

A preferred embodiment of the present invention is described below by reference to the following drawings, in which.

DETAILED DESCRIPTION

Figure 1:
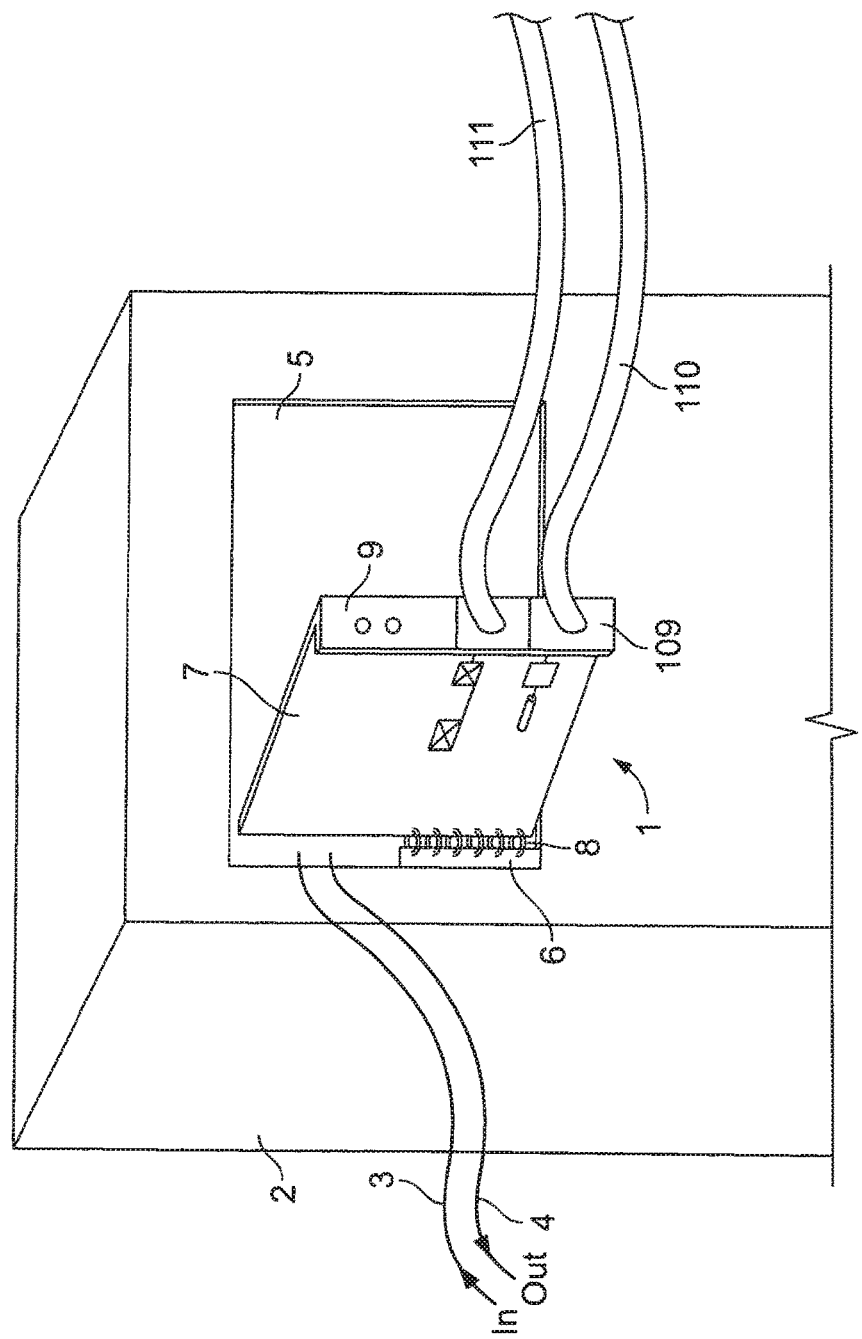
FIG. 1 shows schematically a card of the present invention located in an existing telecommunications box, such as a mutliplexor.

FIG. 1 shows an existing telecommunications box 2, for example a multiplexor, refitted with a card 1 of the present invention. Box 2 has an electronic data input 3 and output 4, which connect to a motherboard 5 of the box 2. Motherboard 5 includes a bus 6 for connecting existing amplitude-based cards to the motherboard 5, and connects the input 3 and output 4, through for example, data conversion circuitry, to the bus 6. The type of bus 6 is dependent upon the box manufacturer, and different types of boxes, motherboards and buses are well known in the art. Card 1 of the present invention includes electrical connections 8 to fit into bus 6.

Card 1 also includes a faceplate 9 and a backplane 7, which preferably is a printed circuit board. Faceplate 9 may be perpendicular to backplane 7 and be flush with a front side of box 2.

Faceplate 9 may have a fiber connector 109, such as a duplex SC connector, for connecting to an output fiber 110 and an input fiber 111. Alternately, a single fiber for inputting and outputting signals could be provided.

Figure 2:
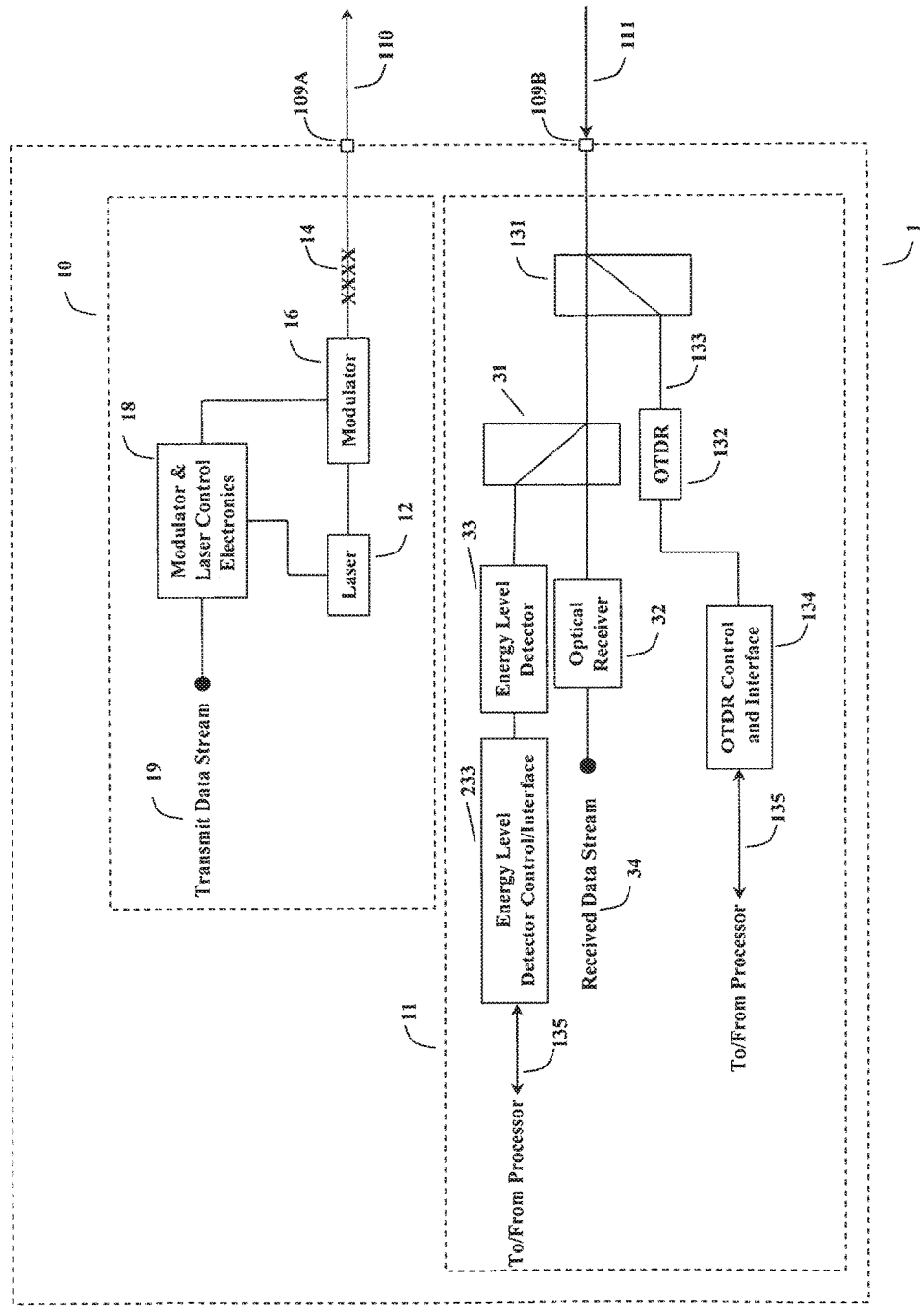
FIG. 2 shows a block diagram of the transceiver of the present invention.

FIG. 2 shows the card 1 of the present invention in more detail. A transmitter 10 transmits signals over optical fiber 110. Transmitter 10 includes a single laser 12, for example a semiconductor laser emitting a narrow band of light at approximately 1550 nm, or at other wavelengths. Light emitted from laser 12 passes through a modulator 16, for example an amplitude or phase modulator, directly next to or part of the same package as laser 12. The light may be depolarized by a depolarizer 14. An electronic controller 18, preferably manufactured directed on the printed circuit board of backplane 7 (FIG. 1), controls modulator 16 and may provide power to laser 12 Input data 19 is fed to the controller 18, which then controls modulator 16 to modulate the light from laser 12 as a function of the input data 19.

The transceiver of the present invention preferably operates in a phase-modulated mode, though conventional amplitude-modulated transmitters and receivers, including those using return-to-zero type signals, for example, may also be used. The phase-modulated signals have the advantage that breach detection by the energy level detector work more effectively, since the amplitude of the optical signal is constant and thus a drop in the optical signal level is more easily detected.

Optical signals are received at connector 109 from fiber 111.

Receiver 11 includes two coupler/splitters 31 and 131, each functioning as a splitter. Splitter 131 is preferably a wavelength division multiplexed coupler/splitter to allow the OTDR 132 to operate at one optical wavelength, for example 1670 nm, while the transmitted data stream 19 and received data stream 34 are carried on a different wavelength, for example 1550 nm. This functionality allows the OTDR 132 on transceiver card 1 to be commanded to continuously operate without interruption or corruption of the received data stream 34. Splitter 131 splits off the wavelength of light applicable to the OTDR into fiber 133, which has an input to OTDR 132. Splitter 31 then splits off a portion of the remaining other light, directing part of the optical energy to an energy level or tap detector 33 and passes the residual light to an optical receiver 32. Optical receiver 32 converts the optical signal from optical to electronic form to recover the electronic data stream 34 as appropriate for the optical modulation technique employed.

OTDR 132 has a control circuit 134 and a bus 135 which allows the device to be controlled by a processor. The OTDR thus can monitor the fiber 111 and provide information through bus 135 to a processor for determining the location of a breach or tap.

Detector 33 monitors the light energy in the fiber 111 via the light energy coupled to the detector by splitter 31. If the amplitude drops during monitoring, which may indicate a tap, the detector 33 provides an alert and can, for example, send and electronic signal to the processor via bus 135 to indicate a drop or increase in the optical energy level, sound an alarm or alert network maintenance personnel, for example through an LED 133 or by sending an alarm message using transmitter 10. Another LEI) 134 can provide an indication of proper signal reception. An energy level detector control circuit 233 controls the alarm threshold and energy detection and provides output indications from the energy detection circuit to a processor via bus 135 which may be shared with the OTDR control circuit 134.

Figure 3:
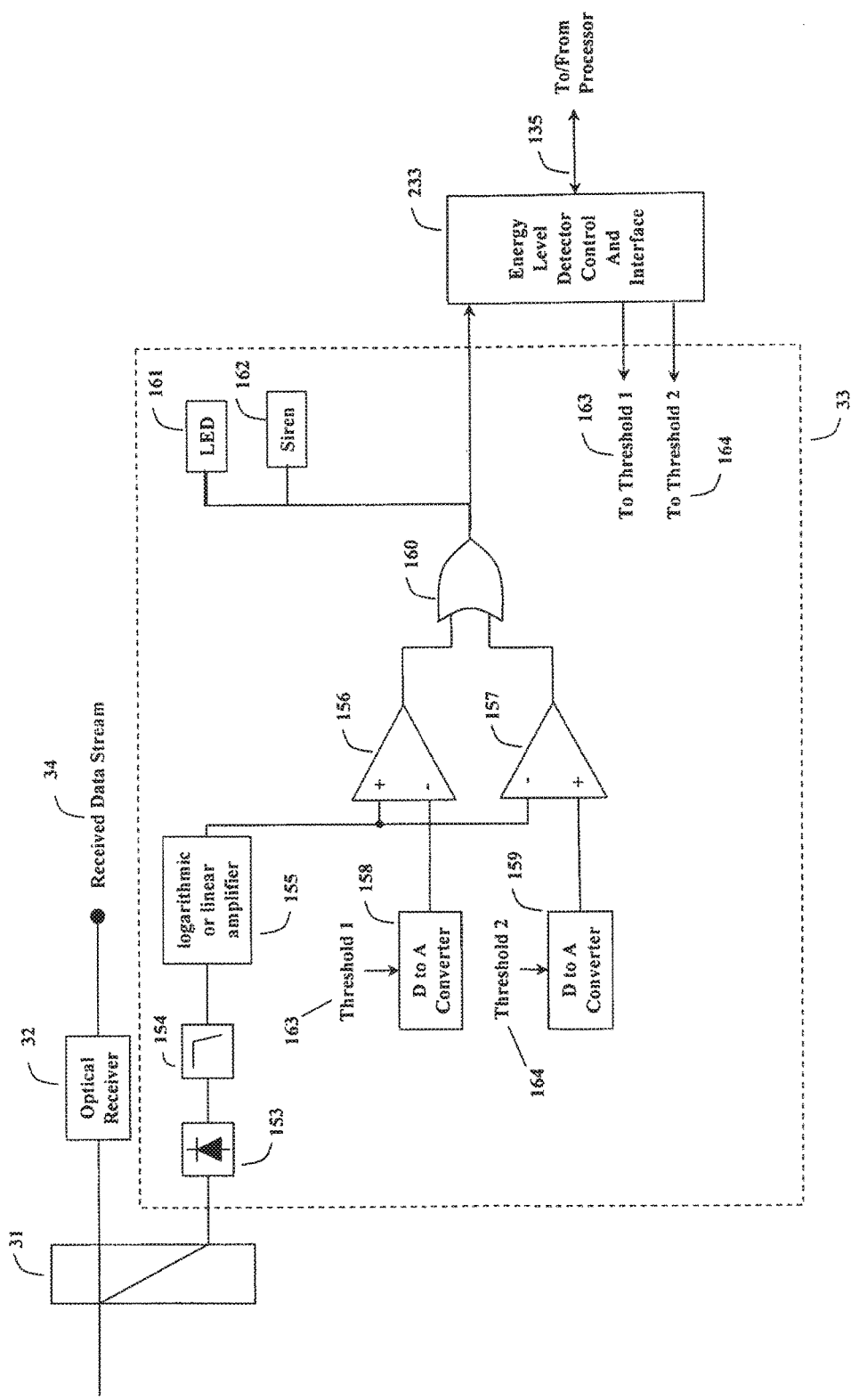
FIG. 3 shows a description of an analog energy level detector of the present invention.

FIG. 3 shows the energy level detector 33 of the present invention in more detail. The energy level detector 33 described by FIG. 3 represents a preferred analog implementation, with other implementation circuits possible, for bounding the optical energy within an acceptable range with thresholds which may be programmable.

A photodetector or other optical to electrical conversion device 153 measures the optical signal coupled to its input by coupler/splitter 31. The output of photodetector 153 is an electrical voltage whose level correlates to the optical power at the input to the photodetector 153 based upon the photodetector 153 transfer optical to electrical conversion transfer function. Depending upon the electrical bandwidth of photodetector 153 and the optical signal format present at the input to photodetector 153, the electrical signal may be filtered by a low pass filter 154 to provide an average voltage level which represents the average optical power measured by photodetector 153. After filtering the signal, the electrical signal may be conditioned and scaled by either a logarithmic or linear amplifier 155. Scaling the data may be necessary to ensure that energy level detection can be made without performance degradation over the span length range required for the circuit. The choice of scaling type is chosen primarily based upon the optical to electrical conversion transfer function of the photodetector and the range of expected optical power levels at the photodetector 153 input based upon span length ranges. Generally, the transfer function of semiconductor photodetection devices is exponential with respect to optical to electrical conversion. For such components, the cascade of an exponential photodetector with a logarithmic amplifier offers the advantage of providing a net linear transfer function from optical power at the input to the photodetector to voltage at the logarithmic amplifier. Thus, a digitally programmable detection threshold can be developed which offers the same resolution per bit regardless of the span length of the device.

The electrical signal, after being scaled by the linear or logarithmic amplifier 155, is compared to reference voltages by one or more comparators. As shown in FIG. 3, comparator 156 will transition from a low to high output when the voltage output from the logarithmic or linear amplifier 155 exceeds the reference voltage established by the digital to analog (D to A) converter 158. Conversely, comparator 157 will transition from a low to high output when the voltage output from the logarithmic or linear amplifier 155 falls below the reference voltage established by the digital to analog converter 159. The output of OR gate 160 will transition from low to high when either the output of comparator 156 or comparator 157 transitions from low to high. For the example of FIG. 3, an alarm state is said to exist when the output of OR gate 160 is high. To indicate an alarm state, the OR gate output may trigger an audible alarm via a siren 162, a visual alarm via a light or light emitting diode (LED) 161 or may indicate an alarm state to the processor via the energy level detector interface 233 and processor bus 135. The reference voltages established by D to A converters 158 and 159 may be programmable through a digital processor or state machine via a digital bus 135 and an energy level detector interface circuit 233. One or more thresholds 163 and 164 may be established to provide reference levels for comparison to determine one or more alarm states. Thus, the circuit of FIG. 3 may be configured to monitor in real time the optical power at the receiver 11 for excess light or too little light to indicate a potential optical tap, tamper or other degradation of the optical signal.

A digital circuit equivalent to FIG. 3 may be developed. Analog to digital conversion of the logarithmic or linear amplifier 155 output followed by comparison of the digital result to digital thresholds either via software or digital hardware would indicate optical energy levels within limits or not. Additional filtering via averaging of digital conversions via a moving average or other digital filtering technique could replace or supplement filtering provided by analog filter 154. A digital implementation also offers information regarding an estimate of the measured optical signal power, both peak and average, by monitoring the analog to digital output via a computer interface.

The component sizes and types will depend upon the type of transmission desired. For example OC-3 cards may vary in size and certain component types from OC-192 cards.

While the cards may be placed in new boxes, the present invention also permits for the removal of existing optical transmission cards to be easily replaced by the enhanced security cards. The fibers are disconnected, the box 2 is simply opened and the amplitude-modulated-based card is removed. The card 1 is inserted into the bus 6 and the fibers are connected.

The card 1 of the present invention may thus provide existing boxes with continual breach localization and detection secure transmission mode capability.

Moreover, a separate OTDR which is space-consuming need not be provided.

While the energy level detector must be at the receiver side, the OTDR also could be located on the transmitter side.

What is claimed is:
1. An optical line card, comprising:
   a printed circuit board including a plurality of components, wherein the plurality of components include:
      an optical connector configured to receive a downstream termination point of an optical fiber;

a wavelength splitter coupled to the optical connector and configured to split an incoming optical signal, received from the optical connector, into a first optical signal and a second optical signal, wherein a carrier signal wavelength of the first optical signal differs from a carrier signal wavelength of the second optical signal;

an optical receiver downstream of the wavelength splitter and configured to detect received data encoded in the first optical signal;

an optical signal monitor configured to monitor a power parameter associated with the first optical signal; and a power alarm configured to generate a power alarm signal responsive to the power parameter failing to comply with one or more power criteria.

2. The optical line card of claim 1, wherein the plurality of components include a photodetector configured to generate an electric signal in accordance with an instantaneous optical power of the first optical signal, wherein the power parameter is associated with the instantaneous optical power.

3. The optical line card of claim 2, wherein the plurality of component include a low pass filter coupled to the photodetector and configured to generate an electric signal in accordance with an average optical power of the first optical signal, wherein the power parameter is associated with the average optical power.

4. The optical line card of claim 3, wherein the plurality of components include a logarithmic amplifier coupled to the low pass filter and configured to generate an electric signal in accordance with a logarithmic optical power of the first optical signal, wherein the power parameter is associated with the logarithmic optical power.

5. The optical line card of claim 2, further comprising a logarithmic amplifier coupled to the photodetector and configured to generate an electric signal in accordance with a logarithmic optical power of the first optical signal, wherein the power parameter is associated with the logarithmic optical power.

6. The optical line card of claim 1, wherein the plurality of components include:
   an optical time domain reflectometer (OTDR) configured to:
      detect a breach in the optical fiber; and
      approximate a location of the breach.

7. The optical line card of claim 6, wherein the OTDR is configured to receive the second optical signal from the wavelength splitter.

8. The optical line card of claim 1, wherein the optical receiver is configured to convert the first optical signal to an electrical signal to recover the received data.

9. The optical line card of claim 8, wherein the plurality of components include:
   an optical data transmitter comprising:
      a laser for producing light;
      a modulator for modulating the light; and
      an electronic control circuit for receiving a transmit data stream and controlling the modulator to modulate the light in accordance with the transmit data stream.

10. The optical line card of claim 8, wherein the modulator comprises a phase modulator for phase modulating the light.

11. An optical line card, comprising:
   a first connector configured to receive a downstream termination point of an incoming optical fiber;
   a second connector configured to connect to a downstream termination point of an outgoing optical fiber;
   a wavelength splitter coupled to the first connector and configured to split an incoming optical signal received from the first connector, into a first optical signal and a second optical signal, wherein a wavelength of a carrier signal corresponding to the first optical signal differs from a wavelength of a carrier signal corresponding to the second optical signal;
   an optical receiver downstream of the wavelength splitter and configured to detect received data encoded in the first optical signal;
   an optical signal monitor downstream of the wavelength splitter and configured to monitor an optical power of the incoming optical signal; and
   a power alarm configured to generate a power alarm signal responsive to detecting the optical power of the incoming optical signal failing to comply with one or more power criteria.

12. The optical line card of claim 11, wherein the optical signal monitor includes a photodetector configured to generate a power signal indicative of the optical power of the incoming optical signal.

13. The optical line card of claim 12, wherein the optical signal monitor includes a low pass filter coupled to the photodetector and an amplifier configured to receive an output of the low pass filter.

14. The optical line card of claim 11, wherein the one or more power criteria include:
   a first power criteria satisfied when the optical power exceeds a lower threshold and
   a second power criteria satisfied when the optical power is below a higher threshold.

15. The optical line card of claim 11, further comprising:
   an optical fiber monitor configured to monitor the incoming optical signal.

16. The optical line card of claim 15, wherein the optical fiber monitor includes an optical time domain reflectometer (OTDR) configured to:
   detect a breach in the incoming optical fiber; and
   approximate a location of the breach.

17. The optical line card of claim 16, wherein the OTDR is configured to receive the second optical signal from the wavelength splitter.

18. The optical line card of claim 11, further comprising:
an optical data transmitter comprising:
   a laser for producing light;
   a modulator for modulating the light; and
   an electronic control circuit for receiving a transmit data stream and controlling the modulator to modulate the light in accordance with the transit data stream.

19. The optical line card of claim 18, wherein the modulator comprises a phase modulator for phase modulating the light in accordance with the transmit data stream.

20. The optical line card of claim 18, wherein the optical receiver is configured to convert the first optical signal to an electrical signal to recover the received data.

* * * * *